United States Patent Office 3,414,213
Patented Dec. 3, 1968

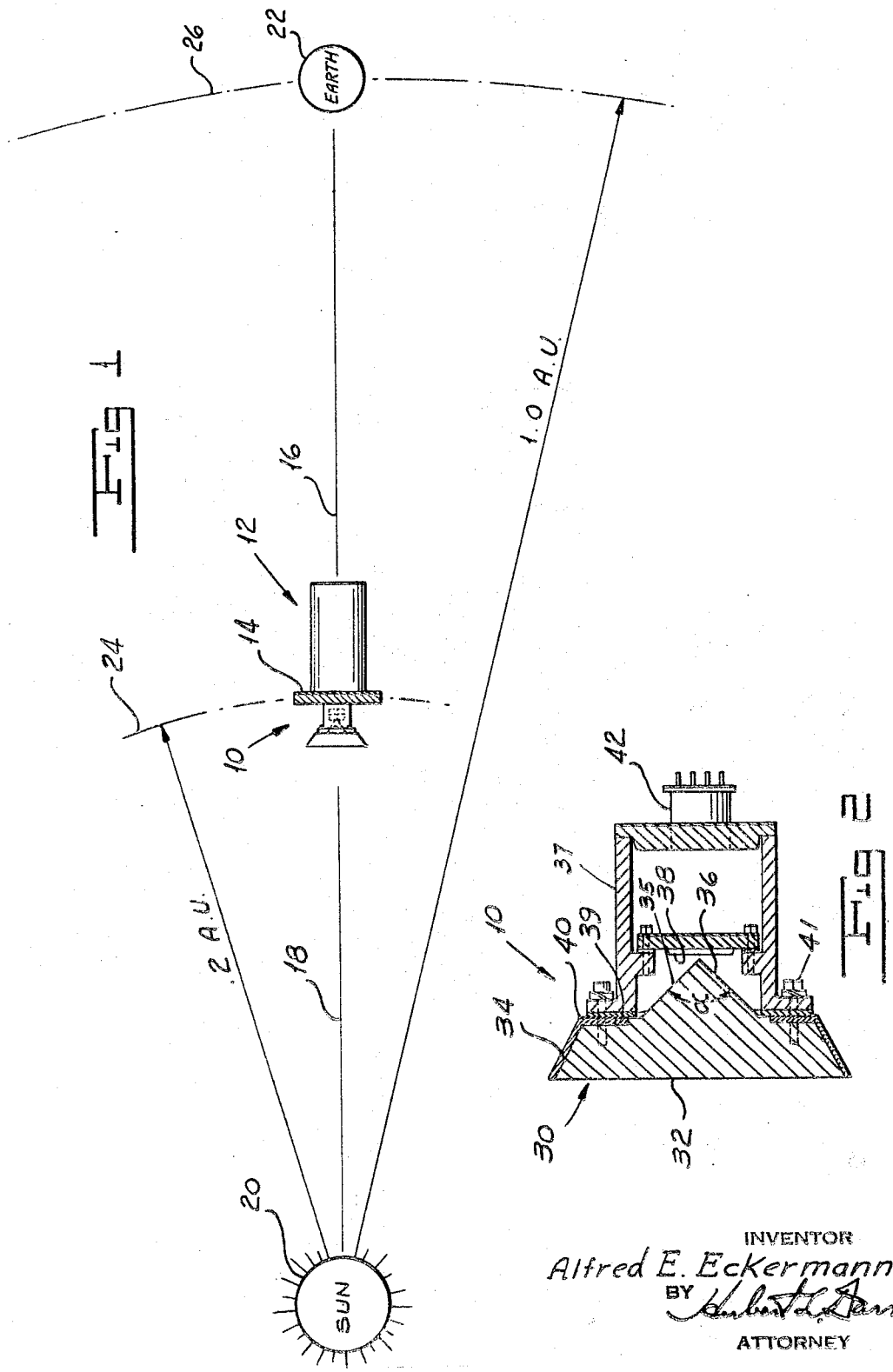

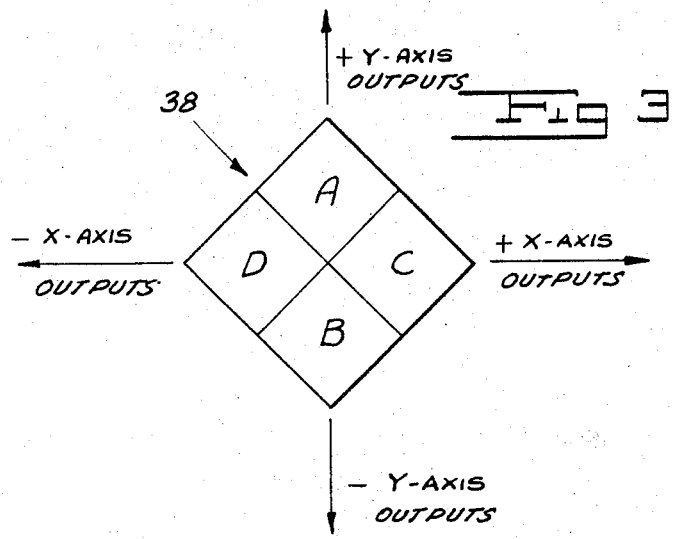
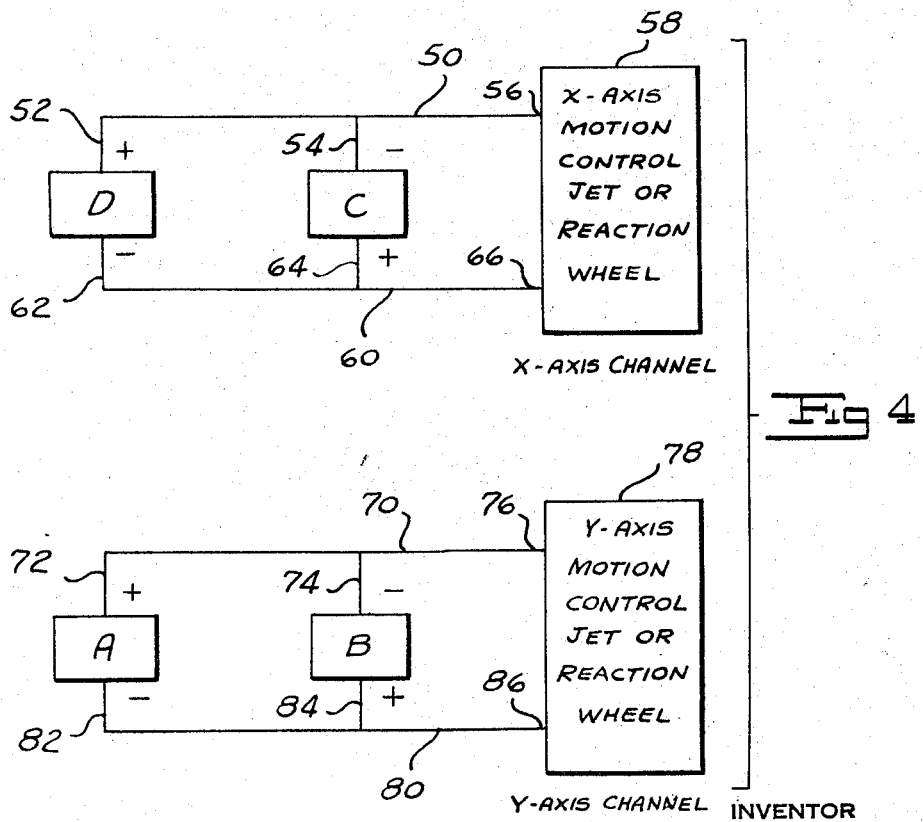

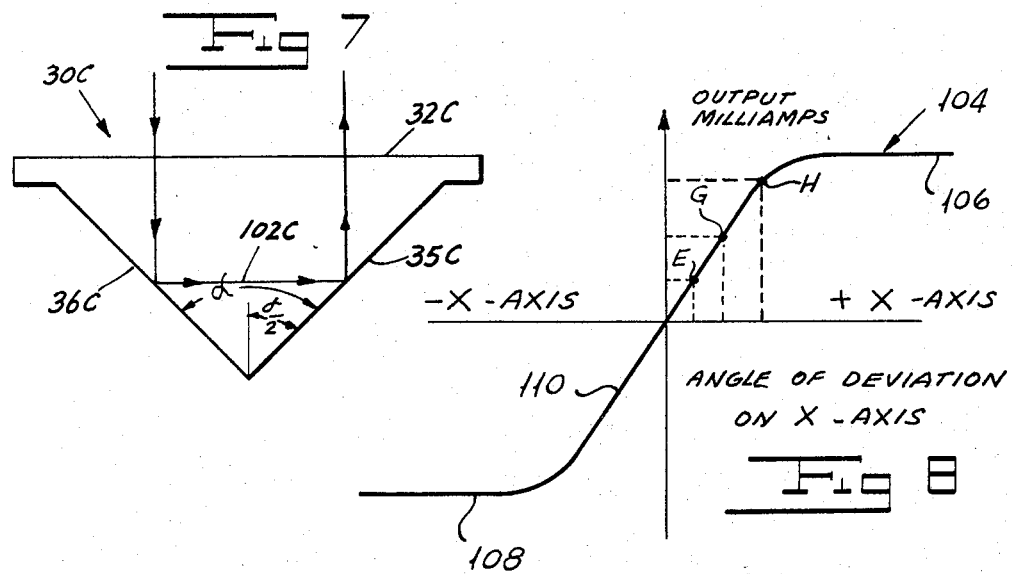
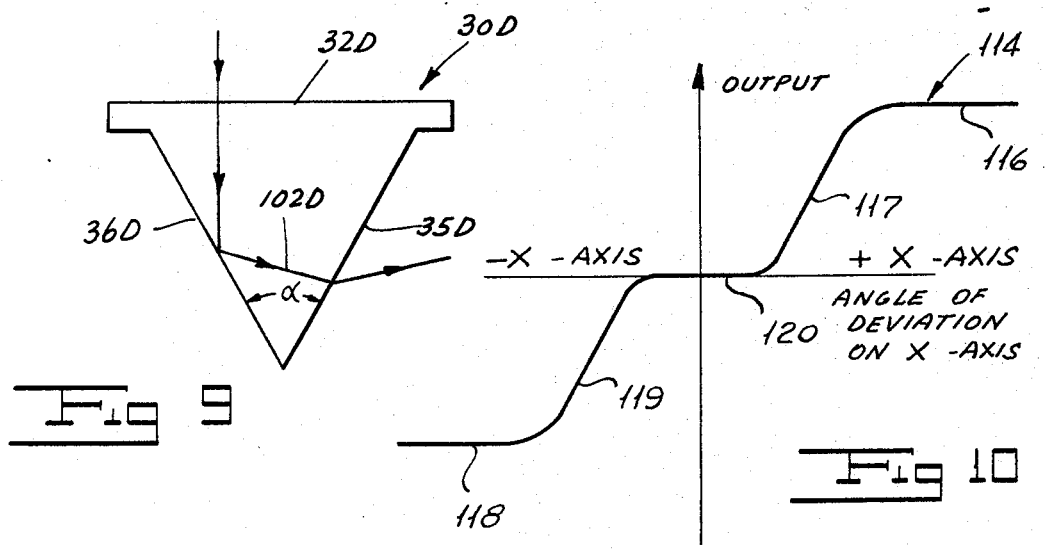

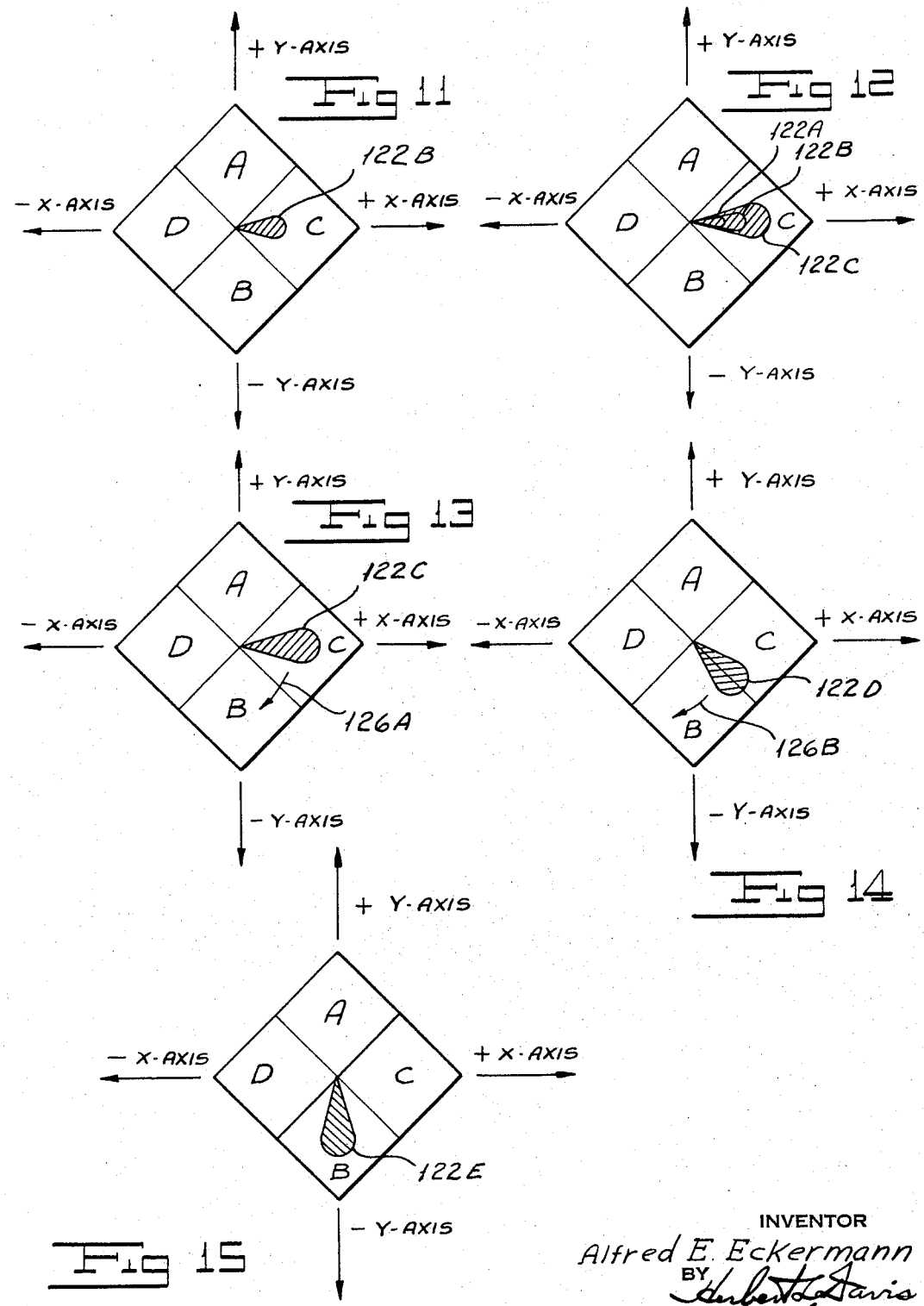

3,414,213
INTERNAL REFLECTION TEMPERATURE
CONTROLLED SUN SENSOR
Alfred E. Eckermann, Hasbrouck Heights, N.J., assignor to The Bendix Corporation, a corporation of Delaware
Filed May 13, 1966, Ser. No. 549,956
9 Claims. (Cl. 244—1)

ABSTRACT OF THE DISCLOSURE

A sun sensor for use in a space vehicle in controlling the operation of the vehicle, the sensor including an internally reflecting conical lens having a ring segment which has a polished front surface acting as a shade for the sensor to prevent incident sunlight from striking the internal elements and sides of the sun sensor and heating it, the conical lens of the sensor having an apex angle for providing a broader null output so that the critical angle exiting at the surface of the lens occurs at other than the normal incident ray angle and further provides in the arrangement of the conical lens, means for internally reflecting substantially all the rays of the sun that may enter the angular cone so as to effect a total internal reflection for protecting the sensor and the sensor detecting cells as well as the space vehicle against the direct rays of the sun, and in addition including a disc acting as a shade for the whole vehicle to prevent incident sunlight from striking the sides of the vehicle and heating it.

---

This invention relates to an internal reflection temperature controlled sun sensor and more particularly to a self temperature controlled sun sensor applicable for use in controlling a space vehicle in relation to the sun. The invention is useful in the science of space vehicle navigation and guidance in the provision of a sun sensor for use in a space vehicle in controlling the operation of the vehicle so as to effect the alignment of the vehicle in relation to the sun and for redirecting the vehicle so as to maintain the sun sensor's axis and the vehicle's axis in line with the direction of the sun, and in providing for the sensor an internally reflecting conical lens having a ring segment which has a polished front surface acting as a shade for the sensor to prevent incident sunlight from striking the internal elements and sides of the sun sensor and heating it, and in addition, in providing for the vehicle a disc acting as a shade for the whole vehicle to prevent incident sunlight from striking the sides of the vehicle and heating it.

The means embodied in the present sun sensor invention combines a conical lens offering a rotationally symmetric field of view and a quad cell sensing structure for use in controlling the space vehicle's navigation system so as to align the sensor and the vehicle with the direction of the sun, and includes a ring segment shade for reflecting the rays from the sun to prevent overheating of the sensor due to the direct rays of the sun. In addition, the means embodied in the present invention includes a shading disc interposed between the vehicle's body portion and the sun to prevent overheating of the vehicle due to the direct rays of the sun when the vehicle approaches the sun. The body of the vehicle is relatively long with relation to its diameter so that a small area will be pointing toward the sun while the body will be cooled by self-radiation.

Heretofore, sun sensors and indicators of various types, utilizing silicon photovoltaic cells, were used in space vehicle controls. The basic sensing element in these particular devices was the silicon cells which was chosen for its numerous virtues among which are simplicity, ruggedness, large variable temperature range of operation, and its ability to act as a power generator and to convert available solar photons directly into electrical current. The silicon cell operates extremely well in ambient temperature of 0±50° centigrade which is the approximate prevailing temperature in a space vehicle traveling in an earth or near earth orbit. For this condition of operation, the conventional sun sensors of today may be placed in direct physical contact with the space vehicle so that heat transfer between space vehicle and sun sensor may be allowed at will, or may be controlled by conventional means, to vary the thermal conduction and thermal insulation.

A problem arises, however, when the space vehicle approaches at an orbit closer to the sun than the earth's orbit. The vehicle encounters an increase in solar radiation of all types and as a result its radiation heat input goes up. The vehicle's temperature, therefore, increases until its self-radiating heat losses become large enough to counterbalance this trend and develop steady state equilibrium.

Sun sensors, in particular, since they must always face the sun, are susceptible to having their temperatures increase to a value much too high, especially when the space vehicle approaches closer to the sun, than when it is in a typical earth orbit. Consider, for instance, a space vehicle which is only .2 astronomical unit from the sun. An astronomical unit is defined as the distance from the earth to the sun. The heat input rate to the sensor per unit area is 25 times higher than if the vehicle were in an earth orbit, and the corresponding temperature of the sensor may reach 200 or 300 degrees centigrade. At these temperatures the silicon photovoltaic cells will not operate.

Therefore, the means embodied in the present invention includes a sun sensor, operating at .2 astronomical unit, constructed so as to enable the sensor to operate in such near sun orbits without overheating.

Therefore, it is an object of this invention to provide an improved means for sensing the direction of the sun which includes total reflecting means for reflecting the sun's rays and thereby allowing the sensor and the space vehicle to operate in a high thermal radiation environment without overheating.

It is another object of this invention to provide a light sensing means for use in a space vehicle in controlling the operation of the vehicle so as to effect the alignment of the vehicle in relation to the sun and for redirecting the vehicle so as to have the sun sensor's axis and the vehicle's axis in line with the direction of the sun and thereby presenting for the sensor an internally reflecting conical lens having a ring segment which has a polished front surface acting as a shade to prevent incident sunlight from striking the internal elements and sides of the sun sensor and heating it.

Another object of this invention is to provide a light sensing means for use in a space vehicle in controlling the operation of the vehicle so as to effect the alignment of the vehicle in relation to the sun and for redirecting the vehicle so as to have the sun sensor's axis and the vehicle's axis in line with the direction of the sun and in further providing for the vehicle a sunlight reflecting disc acting as a shade for the whole vehicle to prevent incident sunlight from striking the sides of the vehicle and heating it and which disc serves as a reflector to sunlight so that incident sun energy is effectively reflected from the disc as well as the disc serving to prevent light rays from striking the relatively long body of the vehicle.

Another object of this invention is to provide for a sun sensor a dead band or null band and means for varying the width of said band by properly choosing the apex angle of a total internal reflection cone for reflecting incident thermal light, thereby allowing the sensor, supporting said reflecting cone, to operate in a highly thermal radiation environment without overheating.

A further object of this invention is to provide a conical lens having an apex angle for providing a broader null output so that the critical angle exiting at the surface of the lens occurs at other than the normal incident ray angle and further provides in the arrangement of the conical lens means for internally reflecting substantially all the rays of the sun that may enter the angular cone so as to effect a total internal reflection for protecting the sensor and the sensor detecting cells as well as the space vehicle against the direct rays of the sun.

These and other objects and features of the invention are pointed out in the following description in terms of the embodiments thereof which are shown in the accompanying drawings. It is to be understood, however, that the drawings are for the purpose of illustration only and are not a definition of the limits of the invention, reference being had to the appended claims for this purpose.

In the drawings:

FIGURE 1 is a schematic celestial diagrammatic representation of a light sensing device embodying the invention;

FIGURE 2 is an enlarged side sectional view of the light sensing device of FIGURE 1;

FIGURE 3 is a front view of the light sensing elements embodied in the present invention of FIGURE 2;

FIGURE 4 is a schematic wiring diagram showing the electrical circuitry interconnecting the various light sensing elements embodied in the present invention so as to provide a system for controlling the attitude of a space vehicle;

Figure 5:
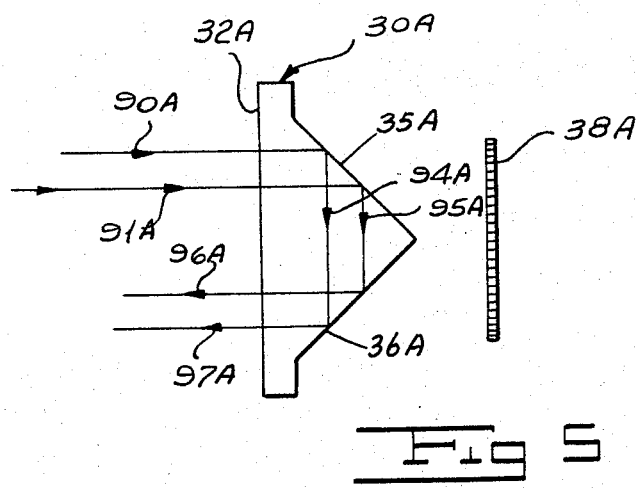
FIGURE 5 is a detailed schematic side view of a modified form of the conical lens embodied in the invention of FIGURE 2 and showing the relation of the sun rays with the surfaces of the lens when the sensor and a satellite supporting the sensor are at a null attitude.

FIGURE 7 is a detailed schematic side view of a further modified form of the conical lens of FIGURE 2 including an apex angle $\alpha \geq \pi - 2\theta_c$ ($\theta_c$ being defined as the angle between the incident ray on surface 36C and the normal to the surface 36C at which angle total reflection occurs for that angle and angles greater, while total transmission occurs for less angles); that is, that the apex angle $\alpha$ is greater than or equal to pi minus two times the critical angle, and at which critical angle value there is total reflection of the sun's rays from its rear conical surface when the sensor is at a null position.

FIGURE 8 is a graphical representation of the output of the circuitry shown by FIGURE 4 with deviation of the light source from the longitudinal axis of the sensing device embodying the conical lens of FIGURE 7;

FIGURE 9 is a detailed schematic side view of a still further modified form of the conical lens of FIGURE 2 including an apex angle $\alpha$, such that the incident angle on the rear conical surface is greater than the critical angle;

FIGURE 10 is a graphical representation of the output of the circuitry shown by FIGURE 4 with deviation of the light source from the longitudinal axis of the sensing device embodying the conical lens of FIGURE 9;

FIGURE 11 is a front view of the quad cell shown in FIGURE 3 showing the illuminated portion as it appears on the face of the quad cell when the sun's rays are directed two degrees off the Y-axis while in the X—X plane;

FIGURE 12 is a front view of the quad cell shown in FIGURES 3 and 11 and showing the illuminated portion as it appears on the face of the quad cell when the sun's rays moves from two to four degrees off the Y-axis while still in the X—X plane; and, FIGURES 13, 14 and 15 are front views of the quad cell shown in FIGURES 3, 11 and 12 showing the illuminated portion as it appears on the face of the quad cell when the rays of the sun are rotated relatively about the longitudinal axis of the sun sensor and showing the illuminated image of the detector as it is rotated about said axis.

Referring now to the drawings and more particularly to FIGURE 1, there is shown a light sensing device such as a sun sensor 10, of the type embodying the present invention, and attached to a space vehicle 12 having a shading disc 14 interposed therebetween. The shading disc 14 is a mirror surface facing the sun to effect total or partial reflection. As shown in FIGURE 1, the combination of the sun sensor 10 and the vehicle 12 is in its null position with an axis 16 of the sensor 10 and the vehicle 12 coincident with an imaginary straight line 18 which extends through the sun 20 and the vehicle 12.

The sensor 10 operably maintains the vehicle 12 so as to be shaded by the shading disc 14 so that the vehicle 12 can receive no direct radiating heat from the sun 20 when it is properly aligned therewith by the sensor 10. Any deviation of the incident light rays from alignment with the axis 16 results in the sensor 10 providing a signal effecting a control function to realign the space vehicle 12 to its null position, as hereinafter described.

The sensor 10 is of particular importance in a space vehicle orbiting at an orbit 24 around the sun 20 which is .2 astronomical unit from the sun as shown in FIGURE 1 or closer. The earth 22 having an orbit 26 is one astronomical unit from the sun.

The sun sensor 10, as shown by FIGURE 2, has a conical lens 30 with a polished front surface 32, polished side conical surfaces 34 and back conical surfaces 35 and 36. Situated behind the apex of the conical surfaces 35 and 36 of the lens 30 and mounted internally within a housing 37 is an area of a silicon photovoltaic or quad cell structure 38 arranged as shown in FIGURE 3.

The conical surface 34 and a circular surface 39 of the lens 30 is aluminized 100 percent to reflect all incident light from the sun. That is, the surfaces 34 and 39 have an aluminized ring segment shade 40 affixed at one end of the housing 37. Suitable bolts 41 or epoxy cement fasten the conical lens 30 and ring segment shade 40 at the one end of the housing 37. The ring 40 shades the sides of the housing 37 so as to keep it cool while lens 30 prevents the incident sunlight from being directed on to the structure 38 during the alignment of the sensor 10 with the sun to prevent overheating thereof. Transmission of sunlight to the quad cell 38 by the lens 30 occurs only when the center of the sun is not aligned with the longitudinal axis of the sensor 10, as hereinafter explained. The shade 40 may also be placed on the front surface 32 of lens 30 around the outer edge leaving just the central portion clear and transparent. The sensor 10 is also provided with a four pin connector 42 mounted at an opposite end of the housing 37 from the shade 40 so as to provide electrical connecting means for the output of the quad cell 38 within the housing 37.

The silicon photovoltaic or quad cell 38 is arranged in the familiar quad cell pattern, as shown in FIGURE 3, with its electrical interconnection, as shown in FIGURE 4. The cell 38 comprises four silicon photovoltaic cells A, B, C and D, each having a square configuration. Cells A and B yield Y-axis outputs and cells C and D yield X-axis outputs.

FIGURE 4 shows one line conductor 50 connecting a positive terminal 52 of the cell D and a negative terminal 54 of the cell C to an input terminal 56 of a suitable electrical control for an X-axis motion control jet of a reaction wheel 58 and which may be of a conventional type. Another line conductor 60 connects a negative terminal 62 of the cell D and a positive terminal 64 of the cell C to an opposite input terminal 66 of the electrical control for the X-axis motion control jet of the reaction wheel 58.

Another line conductor 70 connects a positive terminal 72 of the cell A and a negative terminal 74 of the cell B to an input terminal 76 of a suitable electrical control for the Y-axis motion control jet of a reaction wheel 78 and which also may be of a conventional type. Another conductor 80 connects a negative terminal 82 of the cell A and a positive terminal 84 of the cell B to an opposite input terminal 86 of the electrical control for the Y-axis motion control jet of the reaction wheel 78.

It should be noted that instead of employing an aperture which is used in casting a specific geometric shadow on the quad cells 38; or a lens which images the sun on the quad cell 38, the sensor 10 uses the conical lens 30 which is of a transparent material such as quartz glass or Plexiglas to converge the sunlight onto a light sensitive quad cell structure.

The four output leads 56, 66, 76 and 86 of the quad cell 38 are connected to respective conductor pins of the four pin connector 42 and the conductor pins are in turn connected through suitable electrical conductors to the controls (not shown) of the vehicle 12 and which controls may be of a conventional type.

Again it should be noted, however, that the sunlight is only concentrated on the quad cell 38 when the sun is in an off axis position in relation to the sensor 10.

When the sun rays are directed at an axis in line with the sensor and space vehicle axis 16, the null condition exists and zero output is obtained from the quad cell 38 because all the incident sunlight is internally reflected, as hereinafter more fully described by the appropriately constructed conical lens 30 and expelled through its front surface 32 thereof. Thus, the sensor 10 during the null condition receives zero energy and does not heat up.

A signal is received from the cells A, B, C or D of the quad cell 38 only when the vehicle 12 deviates from the null condition. That is, a signal is received when the sun sensor's longitudinal axis 16 becomes inclined to the sun's radiation vector along the imaginary line 18.

The angle α of the conical lens 30, as shown in FIGURE 2, is so chosen as to be compatible with the material from which it is constructed and the width of the required null. If the null region is to be small or almost zero, then the conical apex angle is so chosen, that the rays of the sunlight which is to exit from the cone is at a critical angle for total internal reflection. This angle depends on the index of refraction for the material and, therefore, depends on the specific material.

A functional diagram is shown in FIGURE 5 of a modified form of the conical lens of FIGURE 2 in which corresponding parts have been indicated by like numerals with the suffix A. When the sensor 10 properly aligns itself and the space vehicle 12 in relation to the sun, light rays from the sun enter lens 30A, as shown by arrows 90A and 91A, normal to its front surface 32A.

The rays will be totally reflected on the rear conical surfaces 35A and 36A as shown by arrows 94A and 95A of FIGURE 5, and then the rays will be completely expelled, as shown by arrows 96A and 97A, under these circumstances so that no energy is delivered to the detector or cells A, B, C or D of the quad cell 38A. The signal is zero as it should be since the sun rays are normal to the front surface 32A. It is also of specific importance to note that no heat is being delivered to the detectors or quad cell 38A or to the sensor 10 as a whole. Since about 95% of all the incident energy is being totally reflected, only a small portion of the incident light or heat is absorbed by the conical lens 30A, as the radiation passes through it.

When the sun rays, however, are incident at an angle θ off null, the rays will pass through the lens 30 of the sensor 10 so as to be delivered to the detectors or quad cell 38. If the rays of the sun enter the lens normal to its front surface, the rays will reflect back to the front surface 32 and out without being delivered to the detector or quad cell 38. Thus, as applied to the modified form of the conical lens 30B of FIGURE 6 if the rays of the sun are in the X—X plane and the off axis angle θ is about two degrees off the Y-axis, the light rays from the sun will enter the front surface 32B of lens 30B as shown by arrows $90B_1$, $90B_2$, $90B_3$, and $90B_4$. The first mentioned ray $90B_1$ will be reflected at one of the rear conical surfaces 35B of the lens 30B, as shown by arrows 94B and 96B, and lost in space at point 1 while the rays $90B_2$, $90B_3$ and $90B_4$ will travel through the lens 30B, past the other rear conical surface 36B of the lens 30B, as shown by points 2, 3, and 4, respectively, and effect an output from the quad cell 38B.

It should be noted that the illuminated portion on the quad cell 38B appears larger as the sun moves to four degrees off the Y-axis, even though it will still be in the X—X plane.

Figure 6:
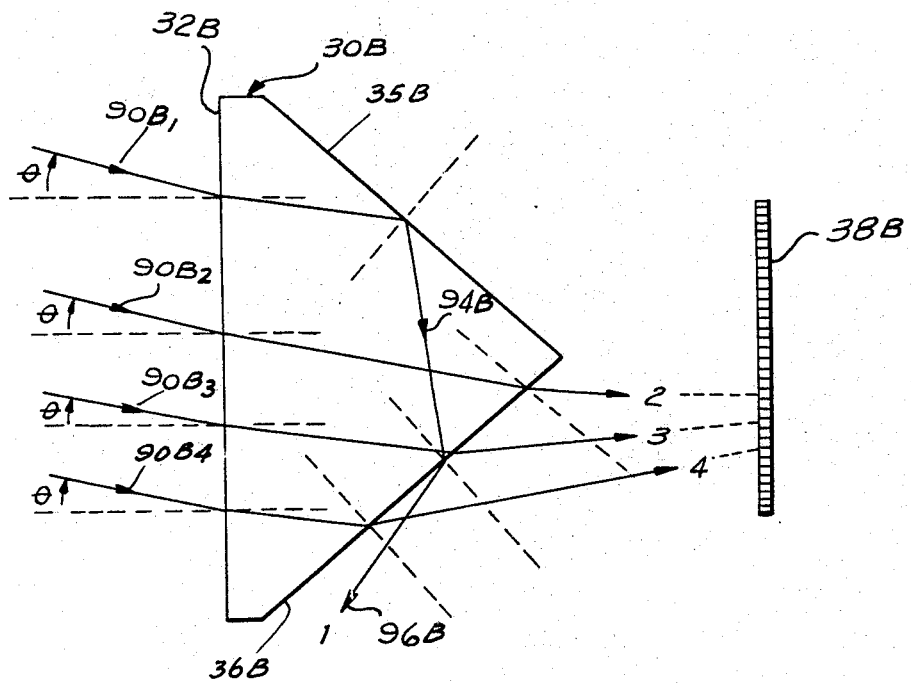
FIGURE 6 is a detailed schematic side view of another modified form of the conical lens of FIGURE 2 illustrating the relation of the sun's rays when the sensor and satellite are in an off axis attitude.

FIGURE 6 shows the incident sun rays 90 at an angle of θ with respect to the normal or front surface 32B of the lens 30B. As brought out before, it should be noted that ray $90B_1$ is lost, but that rays $90B_2$, $90B_3$ and $90B_4$ all combine to form the image 122B, as shown in FIGURE 11, on the detector quad cell 38B. That is, the image would strike one of the four cells in the quad cell structure 38 to produce an electronic signal registered in the graph shown in FIGURE 8. The illumination image therefore of the X-axis channel of the detector will be as shown by numeral 122B in FIGURE 11 and by numeral 122B in FIGURE 12 and the output will correspond to point G of a graph line 114 shown in FIGURE 8. If the rays of the sun are still in the X—X plane and the off axis angel θ from the Y-axis is about one degree, the illumination image of the X-axis channel detector will be as shown by numeral 122A in FIGURE 12 and the output of the X-axis channel will correspond to point E in FIGURE 8. Further, if the rays of the sun are still in the X—X plane and the off axis angle θ from the Y-axis is about four degrees, the illumination image of the X-axis detector will be as shown by numeral 122C in FIGURE 12 and the output of the X-axis channel will correspond to point H in FIGURE 8. As the off axis angle θ from the Y-axis is increased, the illumination image will increase until at some point the output of the X-axis channel will flatten out as shown by line portion 106 of the graph 104 due to saturation of the cell by illumination from the image.

Channel Y for this situation will simultaneously yield zero output. As the sun rotates relatively about the longitudinal axis of the sensor, as shown by arrows 126A and 126B of FIGURES 13 and 14, the illuminated image on the detector will rotate from the illumination image 122C shown in FIGURE 13 to illumination images 122D and 122E shown in FIGURES 14 and 15, respectively. The corresponding detector outputs will signal when the sun is relative to the sensor's longitudinal axis and a correction to the vehicle 12 may be applied. Within one-half a minute or less in time or so, the vehicle 12 may be realigned so that the sun vector is again coincident with sensor normal. Within this short time the heat absorbed by the sun's detector will be negligible and not affect its operation. Line portions 108 and 110 of graph 104 of FIGURE 8 represent the angle of deviation on the negative range of the X-axis the application of this deviation being the same as herein described for the positive range of the X-axis.

Referring to FIGURES 9 and 10, it should be noted that the apex angle α of the modified form of the conical lens 30D may also be slightly varied to produce a broader null. To provide a broader null, the apex angle α of the lens of FIGURE 7 should be made smaller as shown in FIGURE 9, the output of which is indicated in FIGURE 10. A graph 114 of FIGURE 10 can be accomplished by choosing an apex angle α such that the critical angle at the surface 36D occurs when the incident angle on the front surface is different from 90° in relation to the front surface 32D. All of the rays which then enter within this angular cone undergo internal reflection at the surface 36D, as shown by arrow 102D in FIGURE 9. That is, at the positive range of the X-axis the internal reflection will be as shown by portion 120 at zero or small off axis angles $\theta$ and will start producing an illuminated image as shown by portion 117 at larger off axis angles $\theta$ until again at a much greater angle $\theta$ the graph will flatten out as shown by portion 116. The flat portions, indicated at 116 and 118, of the graph in FIGURE 10 extend out to about plus and minus 70°, with an eventual drop to zero at ±90°, which provides a wide field of view and operating range. The reverse portions 118 and 119 will be the sensed deviation on the negative range of the X-axis. The use of a small apex angle $\alpha$ for the lens will produce a system to prevent rapid hunting on slight variations in alignment of the elements of the sensor or the alignment of the sensor with the space vehicle.

Transmission of sunlight to the quad cell 38 by the lens 30 occurs only when the center of the sun is not aligned with the longitudinal axis of the sensor. For specific cases and depending on the closeness of approach to the sun, the finite size of the sun and the angle it subtends at the sensor's position must be taken into account when designing the exact apex angle value. Thus the front surface 32 of the lens 30 may be convex or concave to further enhance this effect.

In summary, therefore, this internal reflection temperature controlled sun sensor provides for a total internal reflecting cone lens permitting the sensor with its supporting space vehicle to operate in a higher thermal radiation environment without overheating.

What is claimed is:

1. For use with a means for controlling attitude of a space vehicle to effect a predetermined alignment of the vehicle in relation to the sun; a sun sensor device of a type including a housing, a light ray detector means having an area mounted internally within said housing for operating said controlling means, and means for conducting light rays from the sun to the area of the detector means within the housing upon a misalignment of the vehicle in relation to the sun; the improvement comprising said light conducting means including means for diverting the light rays from said detector means during said alignment of the vehicle in relation to the sun so as to thereupon prevent the light rays from striking the area of the detector means within the housing and overheating the detector means, and means for shading said sun sensor device and the space vehicle against the direct rays of the sun upon said sun sensor device and said vehicle being in said aligned relation to the sun.

2. For use with a means for controlling attitude of a space vehicle to effect a predetermined alignment of the vehicle in relation to the sun; a sun sensor device of a type including a housing, a light ray detector means having an area mounted internally within said housing for operating said controlling means, and means for conducting light rays from the sun to the area of the detector means within the housing upon a misalignment of the vehicle in relation to the sun; the improvement comprising said light conducting means including means for diverting the light rays from said detector means during said alignment of the vehicle in relation to the sun so as to thereupon prevent the light rays from striking the area of the detector means within the housing and overheating the detector means, and in which the light ray conducting means includes a conical lens providing a rotationally symmetric field of view and having an apex of a predetermined angle for internally reflecting substantially all of said light rays upon such alignment of the space vehicle in relation to the sun so as to thereupon divert the light rays of the sun from said detector means to prevent the direct rays of the sun from striking the area of the detector means within the housing and overheating the detector means.

3. The improvement defined by claim 1 in which the light ray conducting means includes a conical lens providing a rotationally symmetric field of view and having an apex of a predetermined angle for internally reflecting substantially all of said light rays upon the alignment of the space vehicle in relation to the sun so as to thereupon prevent the direct rays of the sun from striking the area of the detector means within the housing, and said detector means including light sensitive elements for receiving and intercepting the light rays from the sun upon the misalignment of said space vehicle relative to the sun for effecting electrical signals to operate the space vehicle controlling means so as to redirect said vehicle into alignment with the direction of the sun and thereupon cause said conical lens to divert the light rays from the internal area of the detector means, and the shading means to effectively shade the sun sensor device and the vehicle, said conical lens and said shading means thereupon cooperating to prevent overheating of the internal area of the detector means and said vehicle from the direct rays of the sun.

4. The improvement defined by claim 3 in which said shading means includes an aluminized ring segment shade substantially encircling said conical lens for reflecting incident rays from the sun and thereby shading said sun sensor device against said rays and for keeping said sensor device within a safe operating temperature range.

5. The improvement defined by claim 3 in which said shading means includes an aluminized ring segment shade substantially encircling said conical lens for reflecting incident rays from the sun and thereby shading said sensor device against said rays and for keeping said sensor device within a safe operating temperature range, and a shading disc interposed between the sun sensor device and said vehicle, and said disc being effective upon alignment of said vehicle with the sun for providing a shade to prevent the direct rays of the sun from striking said vehicle and overheating it.

6. The improvement defined by claim 1 in which the light ray conducting means includes an internally reflecting conical lens having a first predetermined apex angle for diverting the light rays from the area of the detector means within the housing by internal reflection of substantially all of said light rays upon said sun sensor device and said space vehicle being in alignment with the sun, and the area of the detector means within the housing receiving light rays through said conical lens upon the space vehicle being misaligned with the sun by an angle greater than a second predetermined angle, said area of the detector means including a quad cell having light sensitive elements for receiving the light rays from the sun upon said misalignment angle being greater than said second predetermined angle, said light sensitive elements being operably connected to said controlling means for directing said vehicle into alignment with the sun upon said light sensitive elements receiving the light rays to thereupon render said shading means effective for shading said sun sensor device and said vehicle to thereby prevent overheating of said sensor device and said vehicle from the direct rays of the sun.

7. The improvement defined by claim 6 in which the conical lens has an acute first predetermined apex angle providing a relatively wide predetermined null alignment range so as to prevent said light sensitive elements from receiving said sun rays until a relatively large second predetermined angle of misalignment has been effected so as to thereby prevent hunting in the control of said space vehicle.

8. For use with a means for controlling attitude of a space vehicle to effect a predetermined alignment of the vehicle in relation to the sun; a sun sensor device of a type including a housing, a light ray detector means having an area mounted internally within said housing for operating said controlling means, and means for conducting light rays from the sun to the area of the detector means within the housing upon a misalignment of the vehicle in relation to the sun; the improvement comprising said light conducting means including means for diverting the light rays from said detector means during said alignment of the vehicle in relation to the sun so as to thereupon prevent the light rays from striking the area of the detector means within the housing and overheating the detector means, said light ray detector means including a quad cell for receiving light rays applied through the conducting means for providing electrical control signals, the light ray conducting means including a conical lens having a polished front surface and a polished conical surface, said conical lens for optically connecting said detector means to said light rays dependent upon the relation of the space vehicle to the sun, said conical lens providing a rotationally symmetrical field of view for directing light rays from the sun into the area of the detector means within the housing upon the vehicle being in misalignment with the sun by an angular relation in excess of a predetermined angular range and the light rays thereupon impinging on one or the other of said quad cells for effecting the electrical signals dependent upon the sense of the misalignment, and means effectively connecting said electrical signals to operate the vehicle controlling means so as to cause alignment of said vehicle with the sun within said predetermined angular relation, and said conical lens having an apex of a predetermined angle for effectively diverting by internal reflection the light rays from the area of said detector means upon the space vehicle being aligned with the sun within said predetermined angular range.

9. The combination defined by claim 1 in which the light ray conducting means includes an internally reflecting conical lens having a rotationally symmetrically field of view, and wherein said shading means includes a disc interposed between the sun and said vehicle to prevent the vehicle from overheating upon proper alignment of said sensor device and said vehicle, a ring aluminized segment encircling said conical lens for reflecting rays from the sun upon proper alignment of said sensor device and said vehicle with the sun, the area of said detector means within the housing including a quad cell having four silicon photovoltaic cells each having a positive and a negative terminal, the photovoltaic cells of said quad cell for receiving light rays passing through said conical lens upon the misalignment of said space vehicle with the sun and providing electrical outputs dependent upon a sense of the misalignment, and electrical circuitry interconnecting the photovoltaic cells and the means for controlling the attitude of the space vehicle.

References Cited
UNITED STATES PATENTS 3,137,794   6/1964   Seward _____ 250—203 X
3,206,141   9/1965   Dryden.
3,290,933   12/1966   Lillestrand et al. _____ 73—178

FERGUS S. MIDDLETON, *Primary Examiner.*